July 4, 1933.   R. S. DAVIS ET AL   1,916,968
PIPE CLAMP
Filed Nov. 8, 1930   2 Sheets-Sheet 1
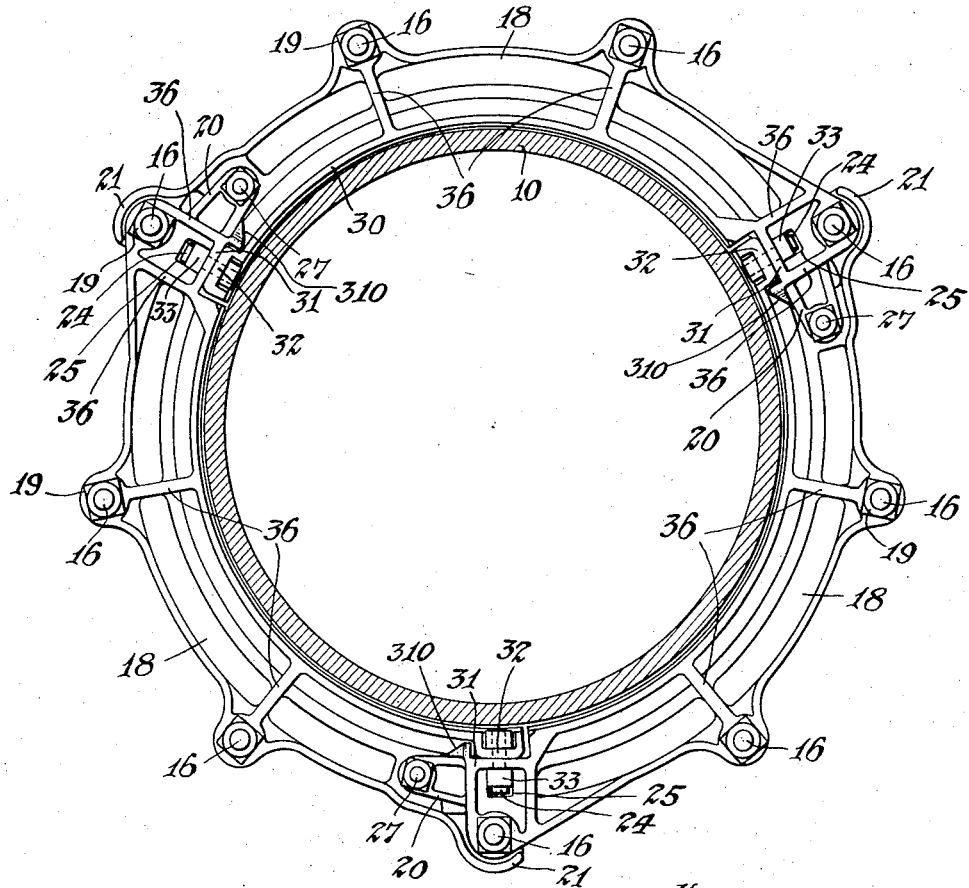
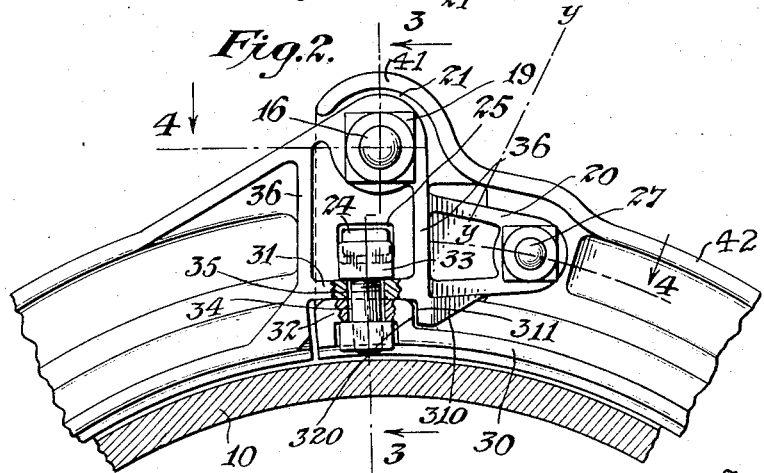
Inventors:
Raymond S. Davis
William L. Beauchamp
By their Attorney
Clarence B. Kerr July 4, 1933.   R. S. DAVIS ET AL   1,916,968
PIPE CLAMP
Filed Nov. 8, 1930   2 Sheets-Sheet 2
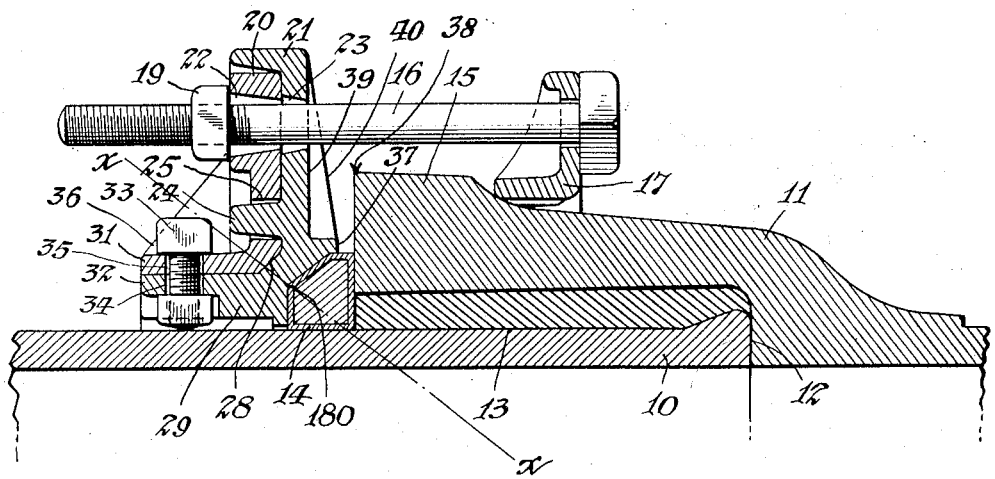
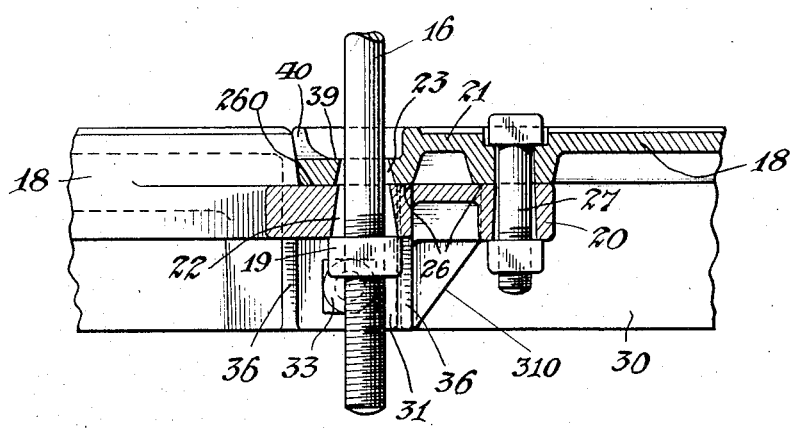
Inventors:
Raymond S. Davis
William L. Beauchamp
By their Attorney
Clarence D. Kerr Patented July 4, 1933

1,916,968

UNITED STATES PATENT OFFICE

RAYMOND S. DAVIS AND WILLIAM L. BEAUCHAMP, OF INDIANAPOLIS, INDIANA, ASSIGNORS TO NATIONAL MALLEABLE AND STEEL CASTINGS COMPANY, OF CLEVELAND, OHIO, A CORPORATION OF OHIO

PIPE CLAMP

Application filed November 3, 1930. Serial No. 494,267.

This invention relates to improvements in pipe clamps used at the joints between sections of cast iron pipe employed in water and gas mains, oil lines and the like.

In pipe lines of the type mentioned cast pipes having cooperating bell and spigot ends are commonly employed and the space between the spigot end of one section and the bell of the next is usually filled with lead or similar sealing material. As a further safeguard against leakage a gasket formed of rubber or other suitable material is placed around each pipe section and forced tightly against the mouth of the bell of the cooperating section. It is in connection with the forcing of the gasket against the mouth of the bell that a clamp of the type contemplated by the present invention becomes particularly useful.

One difficulty which has been encountered in the use of the clamps now commonly employed is in the maintenance of a uniform pressure on the gasket at all points. In order to permit the application of the coupling to a leaky joint, for example, without disconnecting the sections of pipe it is necessary to form in several sections an annular member of the clamp, which bears against the gasket. The sections of this clamping ring must then be bolted or otherwise secured together at their ends to form the complete annulus. In tightening the clamp a number of bolts spaced angularly about the periphery of the clamping ring are ordinarily drawn up to very nearly their maximum limit. The force applied by these bolts to the ring is necessarily at a point adjacent the outer edge of the ring and some distance radially beyond the portion of the ring which bears upon the gasket, due to the fact that the bolts must clear the end of the bell of one of the pipe sections and to a sufficient extent to allow for the normal roughness and variation in size of the bell. This causes a considerable twisting force to be placed upon the ring since its outer edge is being forced in one direction by the action of the bolts and its inner edge of smaller radius is being subjected to a force in the opposite direction by the reaction of the gasket. The twisting force thus set up has a tendency to bring about a separation between the over-lapping portions of adjoining sections of the ring toward the inner edge of the ring. The outer edges of the overlapping portions are normally held together by the clamping bolts but the inner edges are not so held in the constructions heretofore known, and the tendency is, as stated, to produce a separation along these inner edges. In consequence of this separation the force acting on the gasket to seal the joint is greatly weakened at a point adjacent the overlapping ends of the clamp sections so that a leak is apt to develop at this point.

Another cause of improper action between the sectional ring and the gasket is the separation which normally occurs between the overlapping portions of the ring sections when the various clamping bolts are taken up unevenly. If the bolts acting at one side of a joint between two ring sections are tightened to a greater extent than those at the opposite side of this joint the sections will assume positions with their cooperating faces at a slight angle to each other and one, at least, will be slightly out of the true plane perpendicular to the axis of the pipe. This will lead to uneven action on the portion of the gasket adjacent the particular joint in question as it will prevent the adjoining sections of the ring from properly forcing the gasket into position. Still another difficulty which has been met with in connection with clamping rings commonly employed heretofore is that they sometimes become "iron-bound". That is to say due to lack of proper clearance, the inner face of the ring is at times brought against the outer edge of the mouth end of the bell. This condition may arise due to rolling over of the sections of the ring or the bending of the ring along some weakened line due to the pulling forces exerted by the clamping bolts. When this rolling or bending action is sufficiently great to bring about an iron-bound condition of the clamp at any point, further tightening of the clamp is obviously prevented and if the leak has not been stopped before the clamp has become iron-bound the clamp of course will not function in the manner desired.

It has been a primary object of the present invention to so construct and unite the sections of a clamping ring of the type mentioned as to largely or completely overcome the difficulties set forth above. The improved construction is such that separation or angling of the overlapping sections of the ring due to the forces mentioned and the development of an iron-bound condition are substantially prevented and a more uniform action on the gasket is insured.

Other objects and advantages of the invention will appear from the detailed description of an illustrative embodiment of the same which will now be given in conjunction with the accompanying drawings, in which:

Figure 1 is a face view of the assembled clamping ring showing its relation to a pipe;

Figure 2 is an enlarged view of a portion of the ring shown in Figure 1 adjacent the joint between two sections of the ring.

Figure 3 is a vertical sectional view through the coupling taken along the line 3—3 of Figure 2, and Figure 4 is an irregular section taken through the joint between two ring sections along the line 4—4 of Figure 2.

Referring now to the drawings a joint may be formed between the spigot end 10 of one section of pipe and the bell end 11 of an adjoining section. The spigot end 10 will be inserted in the bell end 11 with its free end abutting the shoulder 12 within the bell, and the annular space 13 may be packed in the usual way with any suitable material such as lead. A gasket 14 of rubber or other appropriate material may be placed around the spigot end 10 of one pipe section and may be forced by means of the clamp, which will presently be described, against the mouth of the bell 11 as well as against the outer wall of the pipe end 10 to effect a seal and thus prevent leakage of the gas, water, oil, or the like, which is being transmitted through the pipe.

The clamp consists of a pair of annular members or rings, each formed of several sections, the rings being tied together by suitable clamping bolts 16 which extend longitudinally of the pipes adjacent the bell 11. The end of the bell is provided with an enlargement or flange 15 for cooperation with a bull ring 17 which is one of the rings referred to and which serves as an anchorage against which the heads of the clamping bolts may act. Due to variations in the diameter of the bell ends of cast iron pipes, it is necessary to provide a considerable clearance between the bolts and the enlargement 15. The bull ring is preferably formed in several sections, two or more, which are suitably bolted together to form a unitary ring in the usual manner. Inasmuch as the construction of this ring forms no part of the present invention its construction has not been disclosed in detail.

The clamping ring is similarly formed in several sections 18, a three-sectioned ring being illustrated. Bolts 16 are passed through suitable openings provided at spaced intervals through the sections 18, preferably through ears extending beyond the normal periphery of each section, and nuts 19, carried by the bolts are drawn up tightly against the clamping ring to force the same against the gasket. The center of resistance of the gasket to the force applied through the ring is along a circle passing through the point 180 indicated in Figure 3. This circle is of considerably smaller radius than the bolt circle.

For the purpose of assembling the sections 18 into a continuous ring they are so formed that a portion 20 of one will overlap a portion 21 of the adjacent section. The construction illustrated is such that three of the bolts 16 will pass through three sets of alined openings 22 and 23 provided in the overlapping portions 20 and 21 respectively of the three sections of the ring. It will be understood that all of the three ring sections are alike and each is formed with complementary ends. The bolts 16 which pass through the overlapped portions of the sections would serve alone to tie the three sections together into a complete ring but the various objections previously alluded to would be present. To assist in properly alining the overlapping ends of the sections a dowel projection 24 of rectangular cross section, tapering slightly toward its outer end, may be formed at the end 21 of each section and may cooperate with a rectangular opening 25 in the overlapping end 20 of the adjacent section.

While the interengagement of the dowel and opening assists in providing a more rigid connection between two adjoining sections this will still not prevent the objectionable separation or angling of the overlapped portions in the manner explained. If the nuts 19 should not be taken up uniformly on the bolts 16 there would be a tendency for the cooperating faces 26 to spread apart at an angle from the engaging faces 260 with the result that an uneven force would be transmitted to the gasket and leakage would be apt to develop. To avoid this difficulty the portion 20 of one section is made to overlap the portion 21 of the adjoining section to a considerable extent so that a bolt 27 may be passed through suitable alined openings at a point somewhat removed circumferentially from the point at which the bolt 16 joins the parts. By thus binding the two sections together at two separated points the objectionable spreading in the manner suggested is overcome.

The foregoing provision does not, however, adequately take care of the objectionable separation of the inner edges of the overlapped portions, such as along the surface designated 28 in Figure 3, due to the twisting forces mentioned. Additional means are provided to guard against this distortion of the ring. Toward this end the ring sections are, in the first place, made more rigid than heretofore so as to enable them to resist distortion under the twisting forces. For this purpose the radially innermost portion 29 of each section is widened considerably to provide a broad flange 30. Where the two adjoining sections of the ring overlap, the flange is radially offset as indicated at 31 and 32 in Figures 2 and 3. In this way the portion 20 of one section may be brought into proper relation with the portion 21 of the adjoining section, the flange portion 31 of the portion 20 simply overlying the flange 32 of the portion 21. While this reinforcement of the ring and overlapping arrangement of the flanges aids to a certain extent in the maintenance of the proper relation of the parts, a still further safeguard is provided in the form of a bolt 33 which is passed through aligned openings 34 and 35 in the cooperating flange portions 31 and 32. To permit insertion of the bolt with a clearance between the nut on the same and the surface of the pipe end 10, the flange portion 32 is radially offset to form a pocket for the nut. In the assembly of the ring and its application to the pipe the bolts 33 will be inserted through the openings 34 and 35 after the sections are applied to the pipe and the nut is then slipped into place in the pocket formed in the flange portion 32. Any suitable means may be provided, if desired, for holding the nut in place prior to the insertion of the bolt. In the tightening of the bolts the nuts will be held against turning by the walls of the pockets formed in the flange portions 32.

In lieu of employing bolts 33, as illustrated, to secure the overlapping flange portions 31 and 32, these may be riveted together, if desired, or a cap screw may be employed. In the latter case the flange portion 32 will be tapped to receive the threaded end of the screw and a lock washer may be employed between the head of the screw and the flange 31.

By overlapping and securing together the two portions of the flanges of adjacent sections of the ring a considerable reinforcement is brought about so that the stiffness of the ring at the joints between the sections is substantially doubled. The objectionable twisting tendency is accordingly strongly resisted and quite fully offset. To avoid any danger of shearing the bolts 33 as the result of the stresses set up in the flanges 30 and to assist in retaining the parts in proper relation, a pair of additional cooperating surfaces is provided between the overlapping portions 31 and 32. A lug 310 extending downwardly and outwardly from the portion 20 of each section, as shown in Figures 2 and 4, is provided with a surface 311 which cooperates with a surface 320 carried by the offset portion 32 of the flange of the adjoining section. In this way the portion 32 is confined more or less snugly between two opposed surfaces of the cooperating flange 31.

As a means of making the sections still more stiff and rigid to better resist the twisting forces, a series of ribs 36 extending radially in the planes of or adjacent the openings through which the bolts 16 are passed, may be provided.

To prevent the production of the objectionable iron-bound condition between a portion of the clamping ring and the end of the bell due to bending of the ring about a weak point, as for example along the surface of revolution generated by the line X—X of Figure 3, several changes in the usual construction have been incorporated in the ring of the present invention. In lieu of extending the inner face 37 of each section, or ribs extending therefrom adjacent the bolt receiving ears, vertically to the outer edge of the ring, as in the prior practice, a greater clearance is provided between the edge 38 of the bell and the inner face of the ring. For this purpose the portion 39 of the inner face of the ring at each bolt receiving ear is set back some distance from the surface 37. Reinforcing ribs 40 provided adjacent the surfaces 39 are then tapered or arranged at an inclination from the surface 37 to the edge of the ring. In this way a considerably greater clearance is provided opposite the edge 38 of the bell than in the prior constructions.

In providing the greater clearance mentioned, however, the ring has been weakened somewhat and this weakening of the structure would, if not compensated for, subject the portion 21 of each section to the danger of bending. According to the present invention the weakening of the structure is offset by a reinforcement of the portion 21 by the provision of an extension 41 of a flange 42 which is provided at the outer edge of each section of the ring. Heretofore it has been the general practice in the construction of rings of the type disclosed herein to terminate the outer flange at the point indicated by the line Y—Y in Figure 2. This served to create a weak point about which the portion 21 of the ring section would readily bend and thus prevent the proper functioning of the ring. By providing the extension 41 of the flange the tendency of the end portion 21 to bend and become distorted has been overcome even though the inner surface 39 of the ring has been set-in in the manner explained and the ribs 40 tapered.

While an admirable illustrative form of the invention and a suitable application of the same have been disclosed in considerable detail it will be understood that a variety of changes in the construction and application may be made without departing from the spirit and scope of the invention. The terms and expressions employed herein are for the purposes of description and are not to be considered as imposing any limitations on the invention.

What we claim is:

1. A pipe coupling which comprises a multi-sectioned ring, the sections of said ring having overlapping portions, a bull ring, bolts for tying said multi-sectioned ring and bull ring together certain of said bolts serving to join the overlapping portions of said sections together, and additional means spaced circumferentially from said bolts for drawing together said overlapping portions in a direction parallel with said bolts.

2. In a device of the class described a multi-sectioned coupling ring, the adjoining sections of said ring having overlapping portions, and securing means for uniting said overlapping portions, said means acting along a plurality of spaced longitudinal axes thereof at an angle to each other.

3. In a device of the class described a multi-sectioned coupling ring, the adjoining sections of said ring having overlapping portions, and securing means for uniting said overlapping portions, said means including a plurality of fastening elements having their axes at an angle to each other.

4. In a device of the class described a multi-sectioned coupling ring, the adjoining sections of said ring having overlapping portions, and securing means for uniting said overlapping portions, said means including a plurality of bolts having their axes at right angles.

5. A pipe coupling which comprises a clamping ring and a bull ring, bolts for tying said rings together, the said clamping ring being formed of a plurality of separable sections, adjacent sections of said ring having overlapping portions, said bolts passing through said overlapping portions to join the same, and additional securing means for axially drawing together said overlapping portions of adjacent sections at points spaced from said bolts.

6. A pipe coupling which comprises a clamping ring and a bull ring, bolts for tying said rings together, said clamping ring being formed of a plurality of separable sections, adjacent sections of said ring having overlapping portions, said bolts passing through said overlapping portions to join the same, and means acting along axes at an angle to said bolts for securing said overlapping portions.

7. A pipe coupling which comprises a clamping ring and a bull ring, bolts for tying said rings together, said clamping ring being formed of a plurality of separable sections, adjacent sections of said ring having overlapping portions, said bolts passing through said overlapping portions to join the same and a plurality of additional means associated with each pair of overlapping portions acting along axes disposed at an angle to each other for securing said overlapping portions.

8. In a device of the class described a multi-sectioned coupling ring, the adjoining sections of said ring having overlapping portions, bolts passing through said portions to clamp the same together, said portions having laterally extending overlapping flanges in flat engagement and which extend substantially beyond the main body portion of said sections.

9. In a device of the class described a multi-sectioned coupling ring, the adjoining sections of said ring having overlapping portions, bolts passing through said portions to unite the same, said portions having laterally extending overlapping flanges which extend substantially beyond the main body portion of said sections and means for securing said overlapping flanges.

10. In a device of the class described a multi-sectioned coupling ring, the adjoining sections of said ring having overlapping portions with cooperating surfaces in two separate planes, and means for securing each pair of said cooperating surfaces together.

11. In a device of the class described a multi-sectioned coupling ring, the adjoining sections of said ring having overlapping portions with cooperating surfaces in two separate planes, at substantially right angles to each other and means for securing each pair of said cooperating surfaces together.

12. In a device of the class described a multi-sectioned coupling ring, the adjoining sections of said ring having overlapping portions, a plurality of bolts passing through said overlapping portions, said bolts being spaced circumferentially and radially with respect to each other.

13. In a device of the class described a multi-sectioned coupling ring, the adjoining sections of said ring having overlapping portions bolted together, said portions having cooperating, circumferentially extending flanges, the flange of one portion being held between surfaces carried by the other portion to prevent relative circumferential movements of the sections in either direction.

14. In a device of the class described a multi-sectioned coupling ring, the adjoining sections of said ring having overlapping portions bolted together, said portions having cooperating flanges, the flange of one portion being held between surfaces carried by the other portion to prevent relative circumferential movement of the sections, and means for fastening said flanges together.

15. A pipe coupling for bell and spigot joints which comprises a bull ring mounted on the bell of one pipe, a multi-sectioned clamping ring surrounding the spigot end of a cooperating pipe, a gasket between the clamping ring and the mouth of the bell, said clamping ring having a tapered surface facing the end of said bell and spaced therefrom by said gasket, the sections of said clamping ring having overlapping surfaces extending in a plurality of different planes, and means for securing said overlapping surfaces together.

In testimony whereof, I have signed my name to this specification this 5th day of November, 1930.

RAYMOND S. DAVIS.

In testimony whereof, I have signed my name to this specification this 5th day of November, 1930.

WILLIAM L. BEAUCHAMP.